(12) United States Patent
Chung et al.

(10) Patent No.: US 11,988,781 B2
(45) Date of Patent: May 21, 2024

(54) EXTRINSIC CALIBRATION METHOD OF MULTIPLE 3D LIDAR SENSORS FOR AUTONOMOUS NAVIGATION SYSTEM

(71) Applicant: Korea University Research and Business Foundation, Seoul (KR)

(72) Inventors: Woojin Chung, Seoul (KR); Hyunsuk Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 475 days.

(21) Appl. No.: 17/060,710

(22) Filed: Oct. 1, 2020

(65) Prior Publication Data

US 2021/0103040 A1    Apr. 8, 2021

(30) Foreign Application Priority Data

Oct. 2, 2019    (KR) .......................... 10-2019-0122310

(51) Int. Cl.
    *G01S 7/497*    (2006.01)
    *G01S 17/894*    (2020.01)
    *G01S 17/931*    (2020.01)

(52) U.S. Cl.
    CPC ............ *G01S 7/497* (2013.01); *G01S 17/894* (2020.01); *G01S 17/931* (2020.01)

(58) Field of Classification Search
    CPC ....... G01S 7/497; G01S 17/931; G01S 17/894
    USPC .......................................................... 702/95
    See application file for complete search history.

(56) References Cited

U.S. PATENT DOCUMENTS

2009/0232355 A1    9/2009    Minear et al.

FOREIGN PATENT DOCUMENTS

KR    10-2018-0099090 A    9/2018
KR    10-2019-0064311 A    6/2019

OTHER PUBLICATIONS

Jiao, A Novel Dual-lidar Calibration Algorithm Using Planar Surfaces (Year: 2019).*

(Continued)

*Primary Examiner* — Mohamed Charioui
*Assistant Examiner* — Dacthang P Ngo
(74) *Attorney, Agent, or Firm* — Hauptman Ham, LLP

(57) ABSTRACT

An extrinsic calibration method of multiple 3D LiDAR sensors for an autonomous navigation system is proposed, the method including collecting point clouds by each of the multiple 3D LiDAR sensors; extracting multiple target planes corresponding to a plane from the point clouds of each of the 3D LiDAR sensors; by using the target plane of any one of the multiple 3D LiDAR sensors as a reference plane, detecting a corresponding plane from the target planes of each of the remaining of the 3D LiDAR sensors on the basis of a similarity with the reference plane; calculating initial extrinsic parameters for matching between the reference plane and the corresponding plane based on plane parameters of the reference plane and corresponding plane corresponding to each other; and calculating final extrinsic parameters that minimize variance of measurement points for the reference plane and corresponding plane, on the basis of the initial extrinsic parameters.

8 Claims, 10 Drawing Sheets
(6 of 10 Drawing Sheet(s) Filed in Color)

(56) References Cited

OTHER PUBLICATIONS

Torr, Mlesac A new robust estimator with application to estimating image geometry (Year: 1996).*
Jiao, Automatic Calibration of Multiple 3D LIDAR in urban environment (Year: 2019).*
Kim, Calibration Method between Dual 3D Lidar for Autonomous Vehicle (Year: 2017).*
Choi et al., "Extrinsic Calibration of 2-D Lidars Using Two Orthogonal Planes", IEEE Transactions on Robotics, vol. 32, No. 1, Feb. 2016, pp. 83-98.
Fernández-Moral et al., "Extrinsic calibration of 2D laser rangefinders from perpendicular plane observations", The International Journal of Robotics Research, 2015, vol. 34, No. 11, pp. 1401-1417.
Fernández-Moral et al., "Extrinsic calibration of a set of 2D laser rangefinders", 2015 IEEE International Conference on Robotics and Automation (ICRA), Washington State Convention Center, Seattle, Washington, May 26-30, 2015, pp. 2098-2104.
Underwood et al., "Calibration of range sensor pose on mobile platforms", Proceedings of the 2007 IEEE/RSJ International Conference on Intelligent Robots and Systems, San Diego, CA, USA, Oct. 29-Nov. 2, 2007, pp. 3866-3871.
C. Gao et al., "On-line calibration of multiple LIDARs on a mobile vehicle platform", 2010 IEEE International Conference on Robotics and Automation, Anchorage Convention District, May 3-8, 2010, Anchorage, Alaska, USA, pp. 279-284.
Pusztai et al., "Accurate calibration of multi-LiDAR-multi-camera systems", Sensors 2018, vol. 18, No. 7, pp. 1-22.
Levinson et al., "Unsupervised Calibration for Multi-beam Lasers", Experimental Robotics: The 12th International Symposium on Experimental Robotics, Berlin, Heidelberg; Springer-Verlag Berlin Heidelberg 2014, pp. 179-193.
M. Sheehan et al., "Self-calibration for a 3D laser", The International Journal of Robotics Research, 2012, vol. 31, No. 5, pp. 675-687.
Jeong et al., "Complex Urban LiDAR Data Set", 2018 IEEE International Conference on Robotics and Automation (ICRA), May 21-25, 2018, Brisbane, Australia, pp. 6344-6351.

* cited by examiner

EXTRINSIC CALIBRATION METHOD OF MULTIPLE 3D LIDAR SENSORS FOR AUTONOMOUS NAVIGATION SYSTEM

CROSS REFERENCE TO RELATED APPLICATION

The present application claims priority to Korean Patent Application No. 10-2019-0122310, filed Oct. 2, 2019, the entire contents of which is incorporated herein for all purposes by this reference.

BACKGROUND OF THE INVENTION

Field of the Invention

The present disclosure relates to a point cloud correction method of an autonomous navigation system using multiple 3D LiDAR sensors and, more particularly, to an extrinsic calibration method of multiple 3D LiDAR sensors for an autonomous navigation system, the method calibrating the relative position, that is, extrinsic parameters, between point clouds collected from the multiple 3D LiDAR sensors.

Description of the Related Art

Unmanned driving technology is being applied to robots and automobiles, and thus is accelerating the commercialization of autonomous navigation systems driving in urban environments in recent years. For this reason, for the safety of systems and users, and the accuracy of the system's location recognition, the recognition performance of a driving environment is most important. In order to collect as much information as possible from the surrounding environment without blind spots, multiple sensors of the same type are used in multiple autonomous navigation systems, or sensors with different modalities are combined to form a sensor system.

A 3D LiDAR sensor is one of the most preferred sensors for recognition to provide accurate distance measurements and much geometric information. In recent years, the product lines of high-resolution and low-resolution 3D LiDAR sensors are various, and therefore their utilization value is increased. In the case of the high-resolution 3D LiDAR sensor, it is possible to get a vast amount of point clouds using a single sensor. However, it is difficult to practically apply the sensor to an actual commercial system due to its high price. Meanwhile, the low-resolution 3D LiDAR sensor has a narrow viewing angle and provides point clouds of low density, but has an advantage of being relatively inexpensive. In terms of the autonomous navigation system, it is efficient to measure a wide range of environments while lowering the cost of the entire system, and there is a need for a sensor system that reduces blind spots. Therefore, a plurality of low-resolution 3D LiDAR sensors is frequently used in the autonomous navigation system.

To use multiple LiDAR sensors, the relative position between the sensors must be given exactly. In other words, extrinsic parameter calibration of the multiple LiDAR sensors must be performed.

Methods of calibrating extrinsic parameters of one or more LiDAR sensors have been researched in various studies. As one of the methods, there is a method of matching using feature information such as planes, edges, or vertices existing in the surrounding environment. The extrinsic parameter calibration of multiple 2D LiDAR sensors has been proposed disclosed in a paper titled "Extrinsic Calibration of 2-D LiDARs Using Two Orthogonal Planes (IEEE Trans. Robot., vol. 32, no. 1, pp. 83??98, 2016.)" by D. G. Choi, Y. Bok, J. S. Kim, and I. S. Kweon. In this method, two orthogonal planes were measured with 2D LiDAR sensors, and the extrinsic parameters were calculated using the common area and orthogonality of the measurement points.

An extrinsic calibration method for three 2D LiDAR sensors has been proposed in a paper titled "Extrinsic calibration of 2D laser range finders from perpendicular plane observations (Int. J. Rob. Res., vol. 34, no. 11, pp. 1401-1417, 2015.)" by E. Fernandez-Moral, J. Gonzalez-Jimenez, and V. Arevalo. A common plane was detected by positioning the sensor frames, to which multiple LiDARs were attached, at different angles. The constraint condition that the measurement points of multiple LiDARs form the common plane was used.

In addition, an orthogonal plane was measured with the same sensor system to perform extrinsic parameter calibration has been proposed in a paper titled "Extrinsic calibration of a set of 2D laser range finders (Proc.-IEEE Int. Conf. Robot. Autom., vol. 2015-June, no. June, pp. 2098-2104, 2015.)" by E. Fernandez-Moral, V. Arevalo, and J. Gonzalez-Jimenez. When measuring the orthogonal plane, line segments are detected from the measurement points of the LiDAR sensor, and the calibration was performed using the constraint condition that the line segments are orthogonal or form a common plane. A 2D LiDAR sensor shows good performance, so that the linear vector detected by the 2D LiDAR sensor is used. Although plane information detected by a 3D sensor may be used, it requires considerable modification of the technique.

As another method of calibrating extrinsic parameters between LiDAR sensors, there is a method of using artificial markings such as reflective tape or a box. A method of calibrating extrinsic parameters of multiple LiDARs using a vertical column with reflective tape has been proposed in a paper titled "Calibration of range sensor pose on mobile platforms (IEEE Int. Conf. Intell. Robot. Syst., pp. 3866-3871, 2007.)" by J. Underwood, A. Hill and S. Scheding. Data is collected while moving the vehicle around a pillar fixed on a flat ground. The cost function for horizontal and vertical coordinates are defined from the LIDAR measurement points for the pillar and the ground, respectively, and the conversion between the sensors is obtained to minimize the cost function.

Similarly, extrinsic parameter calibration performed by attaching reflective tapes to pillars existing in the environment and using the reflective tapes detected by each sensor has been proposed in a paper titled "On-line calibration of multiple LiDARs on a mobile vehicle platform (Proc.-IEEE Int. Conf. Robot. Autom., pp. 279-284, 2010.)" by C. Gao and J. R. Spletzer. In particular, in the above study, the nonlinear calibration problem was solved by performing approximation with a second-order cone program (SOCP).

In addition, extrinsic parameter calibration of Multi-LiDAR-Multi-Camera performed using a cube-shaped box has been proposed in a paper titled "Accurate calibration of multi-LiDAR-multi-camera systems (Sensors, vol. 18, no. 7, pp. 1-22, 2018.)" by Z. Pusztai, I. Eichhardt and L. Hajder. Three orthogonal planes on a box were measured with a LiDAR and camera to detect the plane and vertex of the box. When calibrating the relative coordinate between the LiDAR sensors, the vertices of the box detected by each sensor were matched using the registration technique.

An unsupervised calibration method has been proposed for the calibration of intrinsic and extrinsic parameters of a high resolution 3D LiDAR sensor, in a paper titled "Unsupervised Calibration for Multi-beam Lasers (in Experimental Robotics: The 12th International Sym-posium on Experimental Robotics, O. Khatib, V. Kumar, and G. Sukhatme, Eds. Berlin, Heidelberg: Springer Berlin Heidelberg, 2014, pp. 179-193.)" by J. Levinson and S. Thrun. In the point clouds accumulated by vehicle movement, assuming that adjacent measurement points in local space are on the plane, the energy function based on the error of the measurement point and the local plane was defined. The intrinsic and extrinsic parameters for which the corresponding energy function is minimized were optimized by a grid search method. According to the method, although it is possible to calibrate the coordinate system between the vehicle and the LiDAR sensor without additional environmental reorganization, the calibration between multiple LiDAR sensors has not been considered. In addition, since it requires an accurate trajectory of the vehicle, additional equipment such as an inertial navigation system is required.

There is also a study on extrinsic parameter calibration based on the quality of the 3D point clouds. An intrinsic calibration method of a rotating 3D LiDAR sensor has been proposed in a paper titled "Self-calibration for a 3D laser (Int. J. Rob. Res., vol. 31, no. 5, pp. 675-687, 2012.)" by M. Sheehan, A. Harrison and P. Newman. In the above paper, a quality function based on Renyi's Quadratic Entropy (RQE) was proposed to evaluate the quality of the point clouds measured by the sensor. In addition, the intrinsic and extrinsic parameters of the LiDAR sensors that maximize the quality function were calculated. In addition, in the study, a method of calibrating the position between LiDAR sensors was proposed. The method includes collecting 2D and 3D LiDAR sensor data during driving the vehicle, and calculating the extrinsic parameters of the vehicle and LiDAR sensors having the maximum quality function of the accumulated point clouds. Although extrinsic parameters calibration between multiple LiDAR sensors was performed, the method also requires an accurate trajectory of the vehicle.

In order to obtain a relative transformation between multiple 3D sensors, a point cloud registration method, such as an iterative closest point (ICP) method, an ICP transformation method, and normal distribution transform (NDT), may be used.

To calibrate extrinsic parameters of two low-resolution LiDAR sensors, a generalized ICP was applied to the data in the common area of the two sensors, in a paper titled "Complex Urban LiDAR Data Set (Proc.-IEEE Int. Conf. Robot. Autom., pp. 6344-6351, 2018.)" by J. Jeong, Y. Cho, Y. S. Shin, H. Roh, and A. Kim. In this method, the two LiDAR sensors are placed at right angles to each other. Accordingly, after positioning the common area of the two sensors at the floor and a wall perpendicular to each other, three generalized ICP was applied to the point clouds in the area.

In using multiple LiDAR sensors, especially 3D LiDAR sensors, the reason why the extrinsic parameter calibration is important is as follows.

First, when an autonomous navigation system equipped with multiple sensors is commercialized, a large number of systems must be collectively calibrated. Second, in the case of research platforms, the sensor location is often adjusted to find an appropriate configuration thereof. Moreover, the sensors are often attached and detached when inspecting the platforms or reconfiguring the sensor systems. Therefore, the extrinsic parameter calibration must be performed before operating the autonomous navigation system. In view of environmental recognition, it is efficient for autonomous navigation systems to cover a large area with as few sensors as possible. This is especially true when multiple sensors of the same type are used.

Therefore, multiple LiDAR sensors are mounted to have different fields of view so that the driving system may measure a wide area. As a result of this arrangement, the overlapping regions between the sensors are reduced. However, in view of extrinsic parameter calibration, the reduction of the overlapping area makes it difficult to determine the extrinsic parameters between the sensors.

The point cloud registration algorithm such as the ICP transformation technique and NDT provides the relative coordinate between two point clouds. However, the registration may fail when the environment is severely changed or the viewpoints of the two point clouds are significantly different. When using multiple LiDAR sensors, low-resolution 3D LiDAR sensors in particular should have points of view set very differently to each other to measure a large area. In the case of extrinsic parameter calibration, it is difficult to use the registration algorithm in a sensor configuration having different points of view.

In addition, a method using an artificial calibration object requires a special environment configuration, such as creating an object and placing the same in a target environment. The more data is collected from the calibration object, the more robust the estimate of the extrinsic parameters is against the sensor's measurement uncertainty. Therefore, the calibration object must be large enough, or a large number of objects must be placed. However, since artificial calibration objects are usually small, the measuring points of an object are only a small part of the point clouds provided by the LiDAR sensor. As a result, the calibration result becomes sensitive to sensor uncertainty, and the user sometimes needs to set the area of the object without automatically detecting the object.

Motion-based techniques require an accurate trajectory of the vehicle. The trajectory can be obtained using Inertial Navigation System (INS) or visual odometry, but it is not an easy task to estimate the exact trajectory of the system. Therefore, a trajectory estimation error may undesirably lead to an estimation error for extrinsic parameters.

SUMMARY OF THE INVENTION

Accordingly, the present disclosure has been made keeping in mind the above problems occurring in the related art, and an objective of the present disclosure is to provide an extrinsic calibration method of multiple 3D LiDAR sensors for an autonomous navigation system, which uses a plane shape capable of being easily derived from objects such as the ground, walls, and pillars in indoor and outdoor environments without a need for environmental reorganization such as placing a separate artificial mark, when calibrating extrinsic parameters of multiple 3D LiDAR sensors.

In addition, another objective of the present disclosure is to provide an extrinsic calibration method of multiple 3D LiDAR sensors for an autonomous navigation system, the method being capable of optimally calibrating extrinsic parameters by considering the uncertainty of the plane shape while ensuring robust performance even for 3D LiDAR sensors with considerably different points of view.

The objectives may be achieved by an extrinsic calibration method of multiple 3D LiDAR sensors for an autonomous navigation system according to the present disclosure, the method including collecting point clouds by each of the multiple 3D LiDAR sensors; extracting a plurality of target planes corresponding to a plane from the point clouds of each of the 3D LiDAR sensors; by using the target plane of any one of the multiple 3D LiDAR sensors as a reference plane, detecting a corresponding plane from the target planes of each of the remaining of the 3D LiDAR sensors on the basis of a similarity with the reference plane; calculating initial extrinsic parameters for matching between the reference plane and the corresponding plane on the basis of plane parameters of the reference plane and the corresponding plane corresponding to each other; and calculating final extrinsic parameters that minimize variance of measurement points for the reference plane and the corresponding plane corresponding to each other, on the basis of the initial extrinsic parameters.

Herein, the extracting of the target planes may include extracting candidate planes corresponding to a plane from the point clouds for each of the 3D LiDAR sensors through a plane extraction algorithm previously registered; and extracting, as the target plane, a candidate plane that satisfies a predetermined plane condition from among the candidate planes.

In addition, the plane extraction algorithm may include any one of a region growing segmentation technique based on smoothness constraint and a maximum likelihood estimator sample consensus (MLESAC) technique.

In addition, the plane condition may be expressed as a following equation:

$$P_\lambda = (\lambda_2 - \lambda_3)/\lambda_1 \geq P_{\lambda,thr}$$

$$\lambda_3 \leq \lambda_{thr}$$

$$n \geq n_{thr}$$

(where, $P_\lambda$ is a planarity of the candidate plane, $P_{\lambda,thr}$ is a predetermined reference planarity, $\lambda_3$ is variance in a normal direction of the candidate plane, $\lambda_{thr}$ is a predetermined reference variance, n is a number of point clouds constituting the candidate plane, and $n_{thr}$ is a predetermined reference number).

In addition, in the detecting of the corresponding plane, the similarity may be calculated using the plane parameters, and the plane parameters may include a normal vector, a distance from an origin, and a mass center.

In addition, the detecting of the corresponding plane may include calculating, as similarity indexes, an angle between two planes, a distance between the two planes, and a mass center distance between the two planes, using the normal vector, the distance to the origin, and the mass center; calculating a sum of weights of the similarity indexes as a matching error of the two planes; and detecting a target plane having the smallest matching error with respect to the reference plane, as the corresponding plane of the reference plane, for each of the remaining 3D LiDAR sensors.

In addition, the similarity indexes may be calculated by a following equation:

$$\epsilon_{ang}(n_i^R, n_j^S) = \cos^{-1}\left(\frac{n_i^R \cdot n_j^S}{\|n_i^R\|\|n_j^S\|}\right)$$

$$\epsilon_{euc}(d_i^R, d_j^S) = \|d_i^R - d_j^S\|$$

$$\epsilon_{cen}(\bar{p}_i^R, \bar{p}_j^S) = \|\bar{p}_i^R - \bar{p}_j^S\|$$

(where, $\epsilon_{ang}$ is the angle between the two planes, $\epsilon_{euc}$ is the distance between the two planes, $\epsilon_{cen}$ is the mass center distance between the two planes, n is the normal vector, d is the distance from the origin, and $\bar{p}$ is the mass center); and the matching error may be calculated by a following equation:

$$E(\pi_i^R, \pi_j^S) = w_1 \epsilon_{ang} + w_2 \epsilon_{euc} + w_3 \epsilon_{cen}$$

(where, $\pi^R$ is the reference plane, $\pi^S$ is the target plane of the remaining 3D LiDAR sensor, and w is the weight of each of the predetermined similarity indexes)

In addition, the initial extrinsic parameters may include an initial rotation transformation matrix and an initial translation vector;

the initial rotation transformation matrix is calculated by a following equation:

$$\tilde{R}_S^R = V \begin{pmatrix} 1 & 0 & 0 \\ 0 & 1 & 0 \\ 0 & 0 & \det(VU^T) \end{pmatrix} U^T$$

(where, $\tilde{R}_S^R$ is the initial rotation transformation matrix, cross covariance matrix of the normal vectors of the reference plane and the corresponding plane is $H = [n_1^S, \ldots, n_M^S][n_1^R, \ldots, n_M^R]^T$, singular value decomposition of the cross covariance matrix is $USV^T$, M is a number of the reference plane and corresponding plane pairs, n is the normal vector of the plane, a superscript R denotes the reference plane, and a superscript S denotes the corresponding plane; and the initial translation vector is calculated by a following equation:

$$\tilde{t}_S^R = (A^T A)^{-1} A \cdot b$$

$$A = \begin{bmatrix} (n_1^R)^T \\ \vdots \\ (n_M^R)^T \end{bmatrix}$$

$$b = \begin{bmatrix} -(n_1^R)^T R_S^R \bar{p}_1 - d_1^R \\ \vdots \\ -(n_M^R)^T R_S^R \bar{p}_M - d_M^R \end{bmatrix}$$

(where, $\tilde{t}_S^R$ is the initial translation vector, $\bar{p}$ is the mass center of a plane, and d is the distance from the origin in a plane)

In addition, the calculating of the initial parameter may be repeatedly performed until the matching error satisfies a predetermined convergence condition, so that the initial extrinsic parameters are finally calculated.

In addition, the calculating of the final parameters may be performed in such a manner as to minimize a cost function as following:

$$(\hat{R}_S^R, \hat{t}_S^R) = \underset{R_S^R, t_S^R}{\mathrm{argmin}} \sum_{i=1}^M \omega_i \sum_{j=1}^{N_i} E_{i,j}(\Theta)$$

$$E_{i,j}(\Theta) = \|n_i^R \cdot (R_S^R p_j^S + t_S^R) + d_i^R\|^2$$

(where, $\Theta$ is a set of extrinsic parameters, M is a number of the corresponding planes, $N_i$ is a number of measurement points in the i-th corresponding plane, $\omega_i$ is a weight of the i-th corresponding plane, $\omega_i^S = 1/(\sigma_i^S)^2$, and $\sigma_i^S$ is variance in a normal direction of the i-th corresponding plane); and the cost function is applied to a Levenberg-Marquardt technique, and the initial extrinsic parameters are applied as an initial value of the Levenberg-Marquardt technique.

According to the present disclosure, it is possible to provide an extrinsic calibration method of multiple 3D LiDAR sensors for an autonomous navigation system, which uses a plane shape capable of being easily derived from objects such as the ground, walls, and pillars in indoor and outdoor environments without a need for environmental reorganization such as placing a separate artificial mark, when calibrating extrinsic parameters of multiple 3D LiDAR sensors.

In addition, according to the present disclosure, it is possible to provide an extrinsic calibration method of multiple 3D LiDAR sensors for an autonomous navigation system, the method being capable of optimally calibrating extrinsic parameters by considering the uncertainty of the plane shape while ensuring robust performance even for 3D LiDAR sensors with considerably different points of view.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described in detail with reference to the accompanying drawings.

Figure 1A:
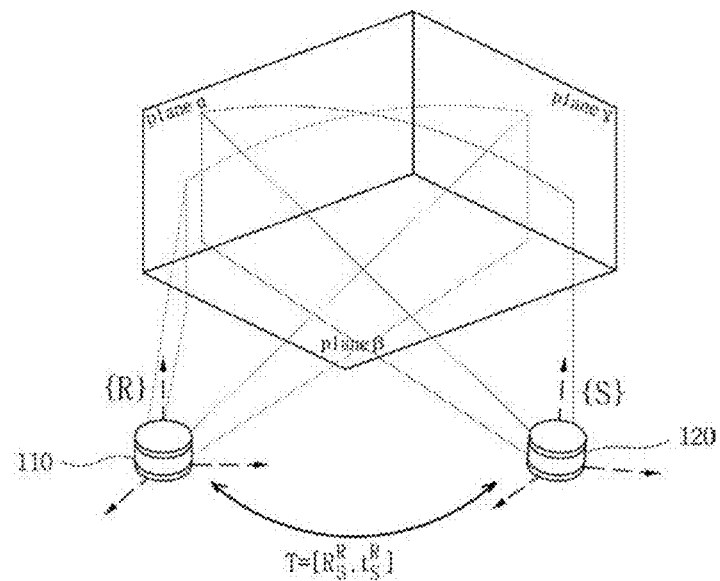
FIGS. 1A and 1B are diagrams showing a concept of an extrinsic calibration method of multiple 3D LiDAR sensors for an autonomous navigation system according to the present disclosure.
Figure 1B:
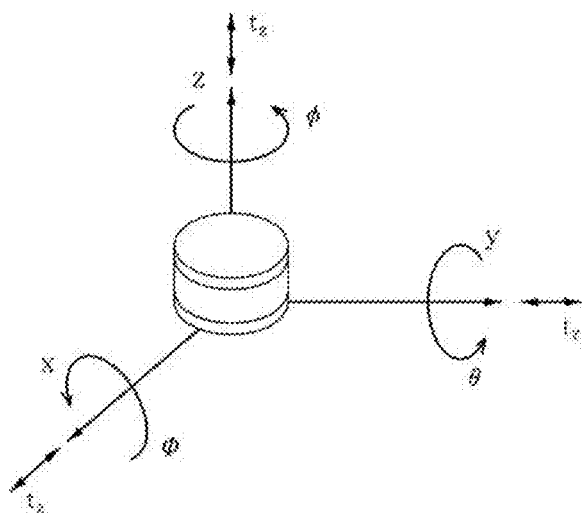

FIGS. 1A and 1B are views showing the concept of extrinsic parameter calibration of multiple 3D LiDAR sensors 110 and 120 for an autonomous navigation system according to the present disclosure. As shown in FIG. 1A, each of the 3D LiDAR sensors 110 and 120 is installed in an autonomous navigation system, such as a vehicle, at different locations to perform sensing in different views and to collect point clouds.

Herein, the coordinate system of any one (hereinafter, referred to as a "reference LiDAR sensor 110") of the multiple 3D LiDAR sensors 110 and 120 may be set to {R}, and the relative coordinate of the remaining one (hereinafter, referred to as a "calibration LiDAR sensor 120") of the 3D LiDAR sensors 110 and 120 is calculated on the basis of the reference LiDAR sensor 110 so that the coordinate system of the calibration LiDAR sensor 120 may be defined as {S}.

The extrinsic parameter calibration method according to the present disclosure is to determine a rotation transformation matrix and a translation vector between {R} and {S}. Herein, elements constituting the rotation transformation matrix and the translation vector become extrinsic parameters to be calibrated. FIG. 1B is a view showing the extrinsic parameters, which may be expressed as Equation 1.

$$\pi = [\phi\theta\varphi t_x t_y t_z]$$ [Equation 1]

The first three elements of Equation 1 constitute the rotation transformation matrix, and the latter three elements constitute the translation vector.

Figure 2:
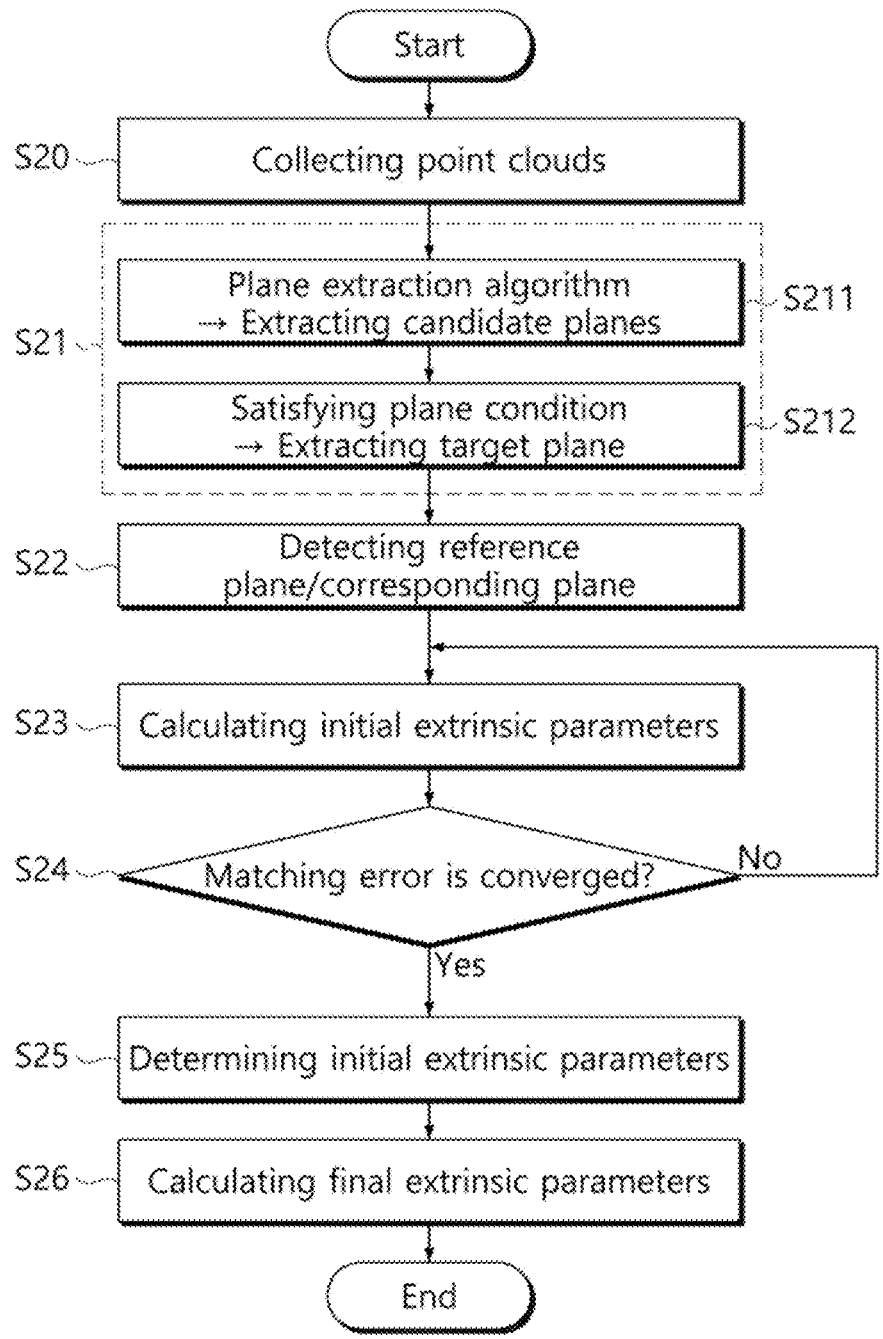
FIG. 2 is a diagram showing an extrinsic calibration method of multiple 3D LiDAR sensors for an autonomous navigation system according to the present disclosure.

FIG. 2 is a view showing an extrinsic calibration method of multiple 3D LiDAR sensors 110 and 120 for an autonomous navigation system according to the present disclosure.

Figure 3A:
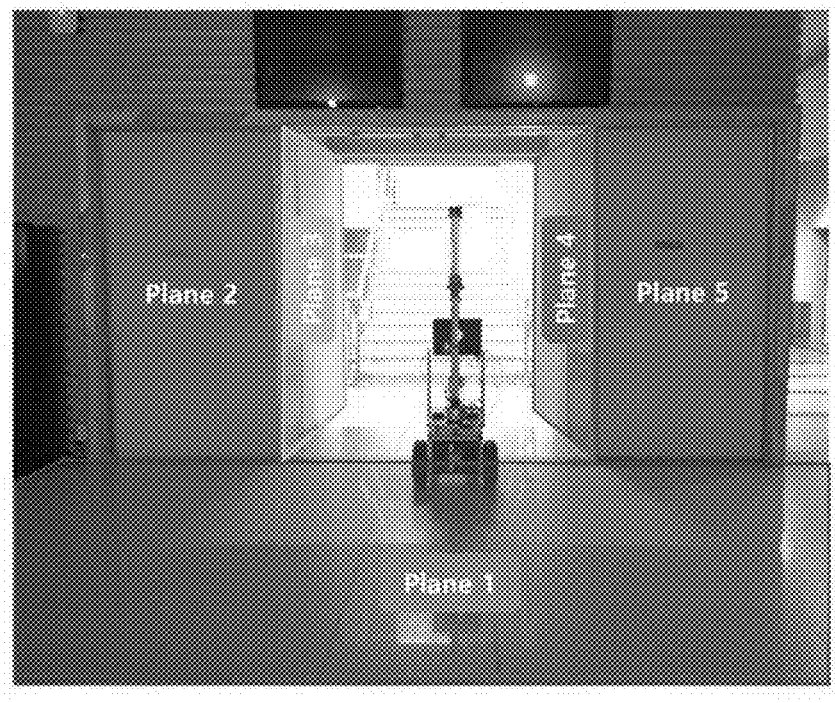
FIGS. 3A, 3B, 4, and 5 are diagrams showing calibration procedures in an extrinsic calibration method of multiple 3D LiDAR sensors for an autonomous navigation system according to the present disclosure.
Figure 3B:
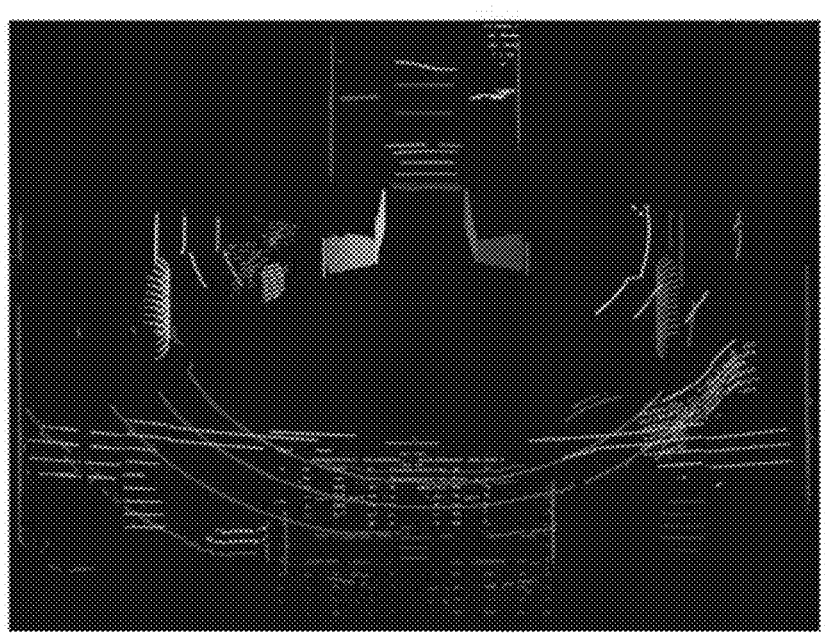

Referring to FIG. 2, point clouds for each of the 3D LiDAR sensors 110 and 120 may be collected through sensing of each of the 3D LiDAR sensors 110 and 120 (S20). FIG. 3A is a photograph showing an actual driving environment, and FIG. 3B is a view showing point clouds collected in the driving environment of FIG. 3A.

Then, a process of extracting a target plane corresponding to the plane from the point clouds of each of the 3D LiDAR sensors 110 and 120 may be performed (S21).

More specifically, candidate planes corresponding to the plane may be extracted from the point clouds for each of the 3D LiDAR sensor 110 and 120 through a plane extraction algorithm that is previously registered (S211). According to the present disclosure, for example, as a method of extracting the candidate planes from the point clouds, any one of a region growing segmentation technique based on smoothness constraint and a maximum likelihood estimator sample consensus (MLESAC) technique may be applied.

Since the distance from surrounding structures is not distant in a small indoor environment, the density of the plane-measurement points collected by the 3D LiDAR sensor 110 and 120 is high. Herein, the region growing segmentation technique based on smoothness constraint may be applied to the point clouds calculated from adjacent measurement points. The region growing segmentation technique divides the point clouds in units of a smooth surface using the normal vector of the measurement point.

Meanwhile, since the point clouds acquired from the 3D LiDAR sensors 110 and 120 in a large-scale environment such as ground or outdoor environments are low resolution, the amount of data may not be sufficient to use the region growing segmentation technique. Herein, it is possible to detect a dominant planar feature in a given environment by using the maximum Likelihood estimator sample consensus (MLESAC) technique. According to the present disclosure, for example, any one of the above two plane extraction algorithms may be selectively used depending on the driving environment of the autonomous navigation system.

When the candidate planes are extracted for each of the 3D LiDAR sensors 110 and 120 through the above process (S211), a candidate plane satisfying a predetermined plane condition may be extracted from among the candidate planes, as a target plane to be calibrated (S212).

According to the present disclosure, the target plane may be extracted using the Eigenvalue of a set of points in the candidate planes. When defining measurement points of a set of points in the candidate planes as $x=(x_i, y_i, z_i)^T$ and the centroid as $$\bar{x} = \frac{1}{n}\sum_{i=1}^{n} x_i,$$

the covariance matrix of the set of points constituting the candidate planes may be calculated through Equation 2.

$$C = \frac{1}{n-1}(x-\bar{x})^T(x-\bar{x}) \quad \text{[Equation 2]}$$

The Eigenvector of the covariance matrix by singular value decomposition means the principal component axis of the set of points, and the Eigenvalue represents the variance of the corresponding principal component axis. Planar segments may be detected using Eigenvalue $\lambda_1 \geq \lambda_2 \geq \lambda_3 \geq 0$.

Herein, the Eigenvalue of the point clouds corresponding to the plane may have a feature of $\lambda_1 \approx \lambda_2 \approx \lambda_3$, and the planarity of the candidate plane may be defined as Equation 3.

$$P_\lambda = (\lambda_2 - \lambda_3)/\lambda_1 \quad \text{[Equation 3]}$$

According to the present disclosure, for example, when the plane condition corresponds to Equation 4, it is determined that the corresponding candidate plane satisfies the plane condition.

$$P_\lambda = (\lambda_2 - \lambda_3)/\lambda_1 \geq P_{\lambda, thr}$$

$$\lambda_3 \leq \lambda_{thr}$$

$$n \geq n_{thr} \quad \text{[Equation 4]}$$

That is, when the planarity of the candidate plane is greater than or equal to the reference planarity $P_{\lambda, thr}$, when the variance $\lambda_3$ in the normal direction of the candidate plane is equal to or greater than the reference variance $\lambda_{thr}$, and when the number n of point clouds constituting the candidate plane is greater than or equal to the reference number $n_{thr}$, it may be evaluated as satisfying the plane condition.

Figure 4:
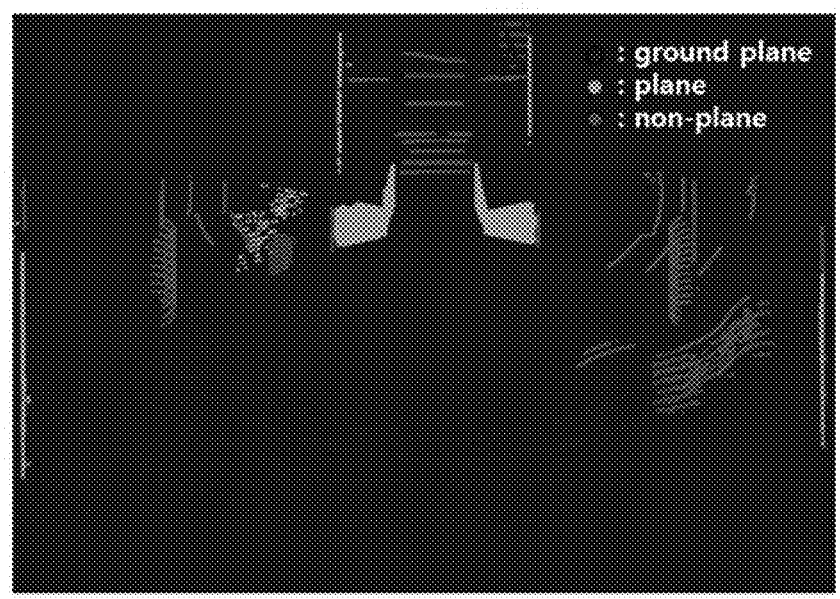

FIG. 4 is a view showing an example of target planes extracted from the point clouds shown in FIG. 3B through an extrinsic calibration method according to the present disclosure.

As described above, when the target planes for each of the 3D LiDAR sensors 110 and 120 are extracted, by using the target planes of any one, that is, the reference LiDAR sensor 110, of multiple 3D LiDAR sensors 110 and 120 as a reference plane, a corresponding plane based on the similarity to the reference plane may be selected from among the target planes of the remaining one, that is, the calibration LiDAR sensor 120, of the 3D LiDAR sensors 110 and 120 (S22).

When the reference LiDAR sensor 110 and the calibration LiDAR sensor 120 are positioned in similar positions, the corresponding plane may be detected at once only by the similarity of the angle and distance between planes. However, when no initial relative coordinate system information exist in the sensor, or when a modeling pose error is large, it is practically difficult to obtain the corresponding plane accurately at once. In addition, when the points of view of the LiDAR sensors are significantly different from each other, the sizes and positions of the planes measured by each LiDAR sensor may be different even when measuring the same plane.

Accordingly, the initial calibration parameter may be calculated through repetitive matching of the plane using the plane parameters according to the present disclosure.

More specifically, the similarity between planes may be calculated using the plane parameters, and a plane with the highest similarity is detected as the corresponding plane. As described above, the corresponding plane for each reference plane may be selected from among the target planes of each calibration LiDAR sensor 120.

Figure 5:
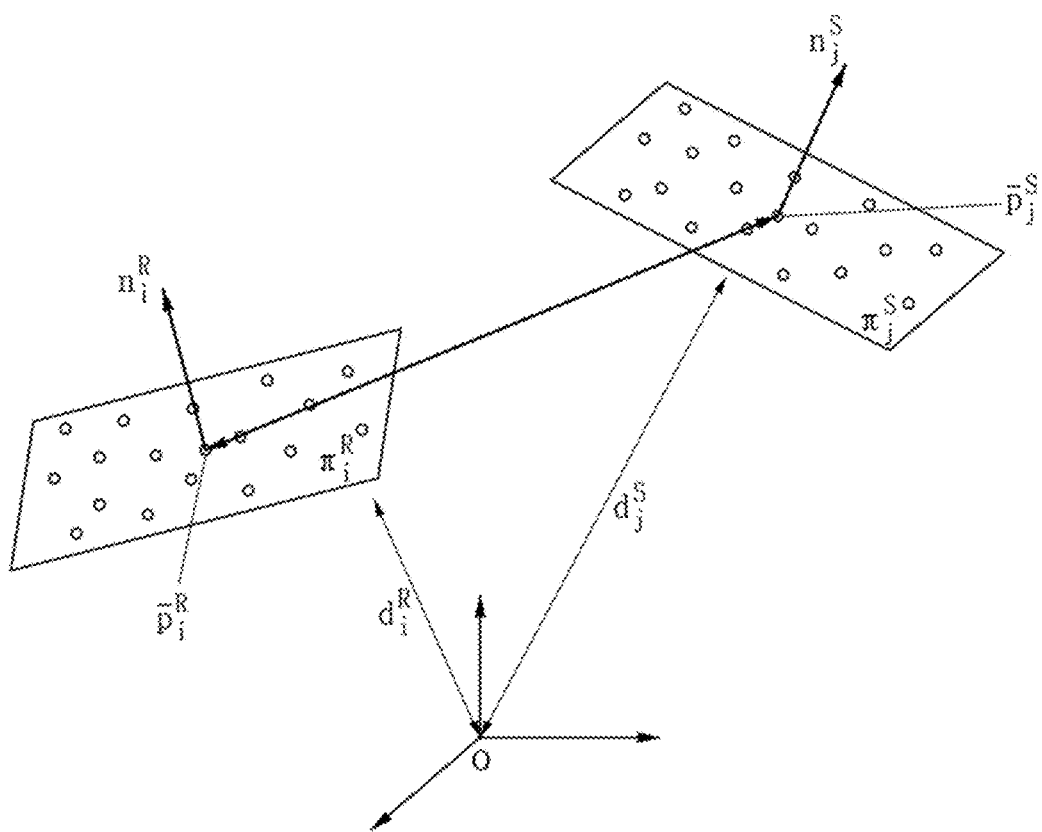

According to the present disclosure, the reference plane is defined as $\pi^R$; the target plane of the calibration LiDAR sensor 120 is defined as $\pi^S$; and the normal vector n, the distanced from an origin, and the mass center $\bar{p}$ are defined as the plane parameters. Therefore, the plane parameters of the reference plane and the target plane of the calibration LiDAR sensor 120 may be defined as $[(n^R)^T, d^R, (\bar{p}^R)^T]$ and $[(n^S)^T, d^S, (\bar{p}^S)^T]$, respectively. FIG. 5 is a view showing the concept of a plane parameter in the extrinsic calibration method according to the present disclosure.

In addition, using the normal vector, the distance from the origin, and the mass center, an angle $\in_{ang}$ between two planes, the distance $\in_{euc}$ between the two planes, and the mass center distance between the two planes may be calculated as similarity indexes. The similarity indexes may be as shown in Equation 5.

$$\epsilon_{ang}(n_i^R, n_j^S) = \cos^{-1}\left(\frac{n_i^R \cdot n_j^S}{\|n_i^R\|\|n_j^S\|}\right) \quad \text{[Equation 5]}$$

$$\epsilon_{euc}(d_i^R, d_j^S) = \|d_i^R - d_j^S\|$$

$$\epsilon_{cen}(\bar{p}_i^R, \bar{p}_j^S) = \|\bar{p}_i^R - \bar{p}_j^S\|$$

In addition, the sum of the weights of the similarity indexes may be calculated as a matching error between the two planes, which is expressed as Equation 6.

$$E(\pi_i^R, \pi_j^S) = \omega_1 \epsilon_{ang} + \omega_2 \epsilon_{euc} + \omega_3 \epsilon_{cen} \quad \text{[Equation 6]}$$

Where, $\omega$ is a weight of each predetermined similarity index.

The matching error as described above may be performed for all the reference planes and the target planes of each calibration LiDAR sensor 120, and a target plane having the smallest matching error with respect to the reference plane is detected as the corresponding plane. Herein, the corresponding plane to the reference plane is detected for each calibration LiDAR sensor 120, so that extrinsic parameters calibration to be described later may be performed for each calibration LiDAR sensor 120. Hereinafter, the present disclosure will be described on the basis of one calibration LiDAR sensor 120 for convenience of explanation. In addition, when the matching errors of each of the target planes of one calibration LiDAR sensor 120 with respect to a specific reference plane are all equal to or greater than a predetermined threshold, the corresponding plane may be determined not to exist for the reference plane and thus may be excluded.

As described above, when detection of the target plane of the calibration LiDAR sensor 120 corresponding to each of the reference planes of the reference LiDAR sensor 110 is completed, an initial calibration parameter for matching between the reference plane and the corresponding plane, that is, relative coordinate transformation is calculated on the basis of the plane parameters of the reference plane and the corresponding plane (S23).

Assuming that the number of reference planes and corresponding planes is M, the reference plane and the corresponding plane may be indicated as $\pi_i^R$ and $\pi_i^S$ (i=1, 2, 3, M), respectively. In addition, initial calibration parameters $[\tilde{R}_S^R, \tilde{t}_S^R]$ for relative coordinate transformation are calculated using the plane parameters of the reference plane and the corresponding plane. Herein, $\tilde{R}_S^R$ is an initial rotation transformation matrix that constitutes the initial calibration parameters, and $\tilde{t}_S^R$ is an initial translation vector that constitutes the initial calibration parameters.

The constraint conditions for matching the reference plane and the corresponding plane may be as shown in Equation 7 and Equation 8.

$$R_S^R n_i^S = n_i^R \quad \text{[Equation 7]}$$

$$n_i^R (R_S^R \bar{p}_i^S + t_S^R) + d_i^R = 0 \quad \text{[Equation 8]}$$

In order to calculate the rotation transformation matrix $R_S^R$, the constraint condition indicated in Equation 7 may be used, and an initial rotation transformation matrix that satisfies the constraint of the normal vector n may be calculated by minimizing Equation 9, for given M pairs of reference planes and corresponding planes.

$$\tilde{R}_L^R = \underset{R}{\mathrm{argmin}} \sum_i^M \|R_S^R n_i^S - n_i^R\|^2 \quad \text{[Equation 9]}$$

Equation 9 has a closed-form solution by a Kabsch algorithm. Herein, when cross covariance matrix of the normal vectors of the reference plane and the corresponding plane is defined as $H = [n_1^S, \ldots, n_M^S \| n_1^R, \ldots, n_M^R]^T$, and singular value decomposition (SVD) of the cross covariance matrix is defined as $USV^T$, the initial rotation transformation matrix may be calculated through Equation 10.

$$\tilde{R}_S^R = V \begin{pmatrix} 1 & 0 & 0 \\ 0 & 1 & 0 \\ 0 & 0 & \det(VU^T) \end{pmatrix} U^T \quad \text{[Equation 10]}$$

Meanwhile, the initial translation vector may be calculated by a linear system accumulating the constraint condition of Equation 8, and may be expressed as Equation 11.

$$A\tilde{t}_S^R = b \quad \text{[Equation 11]}$$

$$A = \begin{bmatrix} (n_1^R)^T \\ \vdots \\ (n_M^R)^T \end{bmatrix}, \quad b = \begin{bmatrix} -(n_1^R)^T R_S^R \bar{p}_1 - d_1^R \\ \vdots \\ -(n_M^R)^T R_S^R \bar{p}_M - d_M^R \end{bmatrix}$$

A least square solution for the linear system shown in Equation 11 may be expressed as in Equation 12.

$$\tilde{t}_S^R = (A^T A)^{-1} A \cdot b \quad \text{[Equation 12]}$$

Herein, in order to obtain a unique solution for the initial rotation transformation matrix in Equation 10, a rank of the cross covariance matrix H must be 3. Likewise, to obtain a unique solution for the translation vector, the set A of normal vectors in Equation 11 must be a reversible matrix. That is, a rank of A must also be 3. Therefore, in order to calculate the relative coordinate between the two 3D LiDAR sensors 110 and 120, three or more non-parallel planes must exist.

According to the present disclosure, for example, the process of calculating the initial calibration parameter is repeatedly performed until the matching error of Equation 6 satisfies the predetermined convergence condition, so that the initial calibration parameter may be finally calculated (S24).

For example, when the deviation between the matching error in the kth iteration and the matching error in the k-1th iteration becomes smaller than a predetermined threshold, the iteration process is completed, so that the initial calibration parameter at this time may be determined as the final initial calibration parameter (S25).

As described above, when the initial calibration parameters, that is, the initial rotation transformation matrix $\tilde{R}_S^R$ and the initial translation vector $\tilde{t}_S^R$ are calculated, the optimization process is performed using the measurement points of the reference plane and the corresponding plane.

Herein, in the constraint condition of Equation 8, all measurement points P may be substituted for the mass center $\bar{P}$ to calculate the variance of the measurement points for each of the reference plane and the corresponding plane. To ensure that the variance of the measurement points for all reference plane and corresponding plane pairs is minimized, the optimal transformation between the reference plane and the corresponding plane may be calculated by minimizing the cost function shown in Equation 13.

$$(\hat{R}_S^R, \hat{t}_S^R) = \underset{R_S^R, t_S^R}{\mathrm{argmin}} \sum_{i=1}^{M} \omega_i \sum_{j=1}^{N_i} E_{i,j}(\Theta) \quad \text{[Equation 13]}$$

$$E_{i,j}(\Theta) = \|n_i^R \cdot (R_S^R p_j^S + t_S^R) + d_i^R\|^2$$

In Equation 13, $\Theta$ is a set of extrinsic parameters and $[\phi \theta \varphi t_x t_y t_z]$ as described above. In addition, M is the number of corresponding planes as described above, $N_i$ is the number of measuring points in the ith corresponding plane. $\omega_i$ is a weight of the ith correspondence plane, $\omega_i^S = 1/(\sigma_i^S)^2$, and $\sigma_i^S$ is the variance in the normal direction of the ith corresponding plane. When the variance is large, low weight is given upon calculating extrinsic parameters, assuming that the plane information is uncertain.

In order to solve nonlinear least squares problems, a Levenberg-Marquardt technique is applied according to the present disclosure. The Levenberg-Marquardt technique iteratively updates the estimates of the extrinsic parameters $\Theta$ so that a given error function is minimized.

When defining a deviation that becomes $E_{i,j}(\Theta) = \|e_{i,j}(\Theta)\|^2$, the Jacobian matrix for updating the extrinsic parameters may be expressed as Equation 14.

$$J_{i,j} = \frac{\partial e_{i,j}}{\partial \Theta}, \quad e_{i,j} = \frac{1}{\sigma_i^S}(n_i^R (R_S^R p_j + t_S^R) + d_i^R) \quad \text{[Equation 14]}$$

In Equation 14, the Jacobian matrix is a length of $\Sigma_{i=1}^{M} N_i$, and the dimension is 6 as in the set of extrinsic parameters. Here, the initial extrinsic parameters obtained from the initial rotation transformation matrix and translation vector, which are calculated in the above-described process, may be set as initial values. The extrinsic parameters updated in the iterative processes of Levenberg-Marquardt technique may be expressed as in Equation 15.

$$\Theta_{k+1} = \Theta_k - (J^T J + \lambda \, \mathrm{diag}(J^T J))^{-1} (J^T e) \quad \text{[Equation 15]}$$

Finally, the final extrinsic parameters may be calculated through the update process as described above (S26).

Hereinafter, experimental results for explaining the effect of the extrinsic calibration method according to the present disclosure will be described with reference to FIGS. 6A, 6B, 7A, 7B, 8A, 8B, 9A, 9B, 10A, and 10B.

An experiment was conducted using a robot to which two 3D LiDAR sensors 110 and 120 are attached. The experiment was conducted in the environment shown in FIG. 3A. One of the two 3D LiDAR sensors 110 and 120 was installed horizontally at a height of 1.9 m, and the other was installed at a height of 1.4 m and tilted 22.5 degrees to face the ground.

Figure 6A:
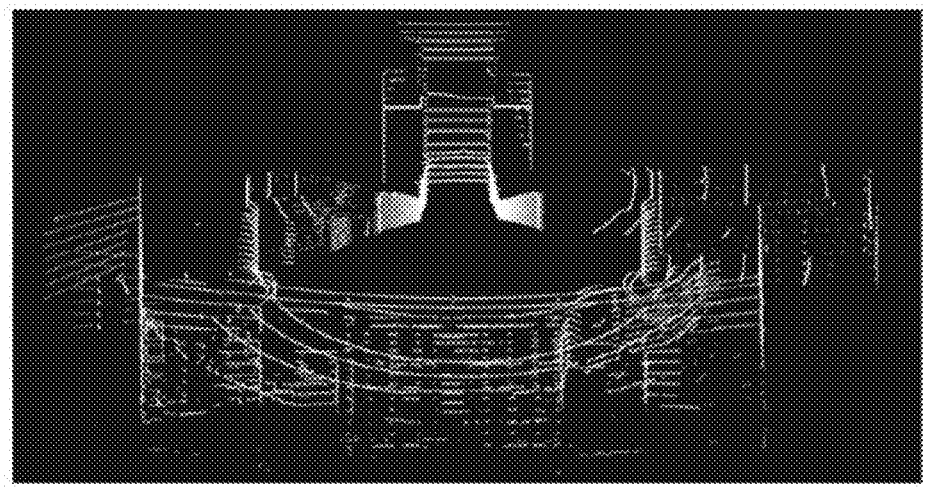
FIGS. 6A, 6B, 7A, 7B, 8A, 8B, 9A, 9B, 10A, and 10B are diagrams showing effects of an autonomous navigation system using multiple 3D LiDAR sensors according to the present disclosure.
Figure 6B:
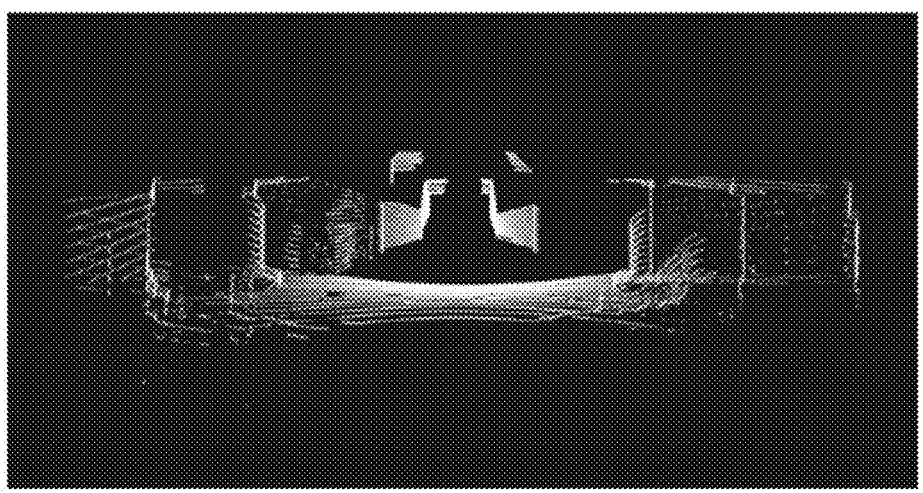

The experiment was conducted by setting the higher one of the 3D LiDAR sensors 110 and 120 as the reference LiDAR sensor 110, and setting the lower one of the 3D LiDAR sensors 110 and 120 as the calibration LiDAR sensor 120. FIGS. 6A and 6B are views showing raw data collected by the reference LiDAR sensor 110 and the calibration LiDAR sensor 120, respectively. As shown in FIGS. 6A and 6B, it may be seen that two pieces of the raw data are represented to be different from each other according to the installation position and the viewing angle.

Figure 7A:
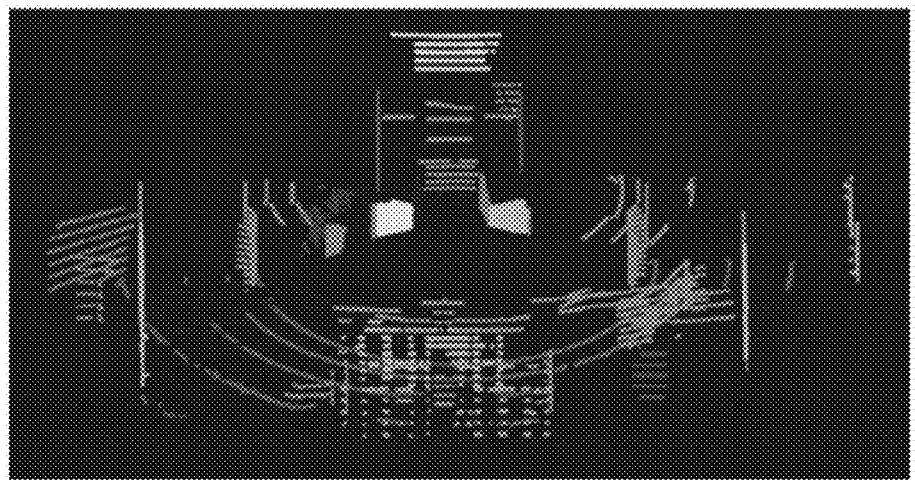
Figure 7B:
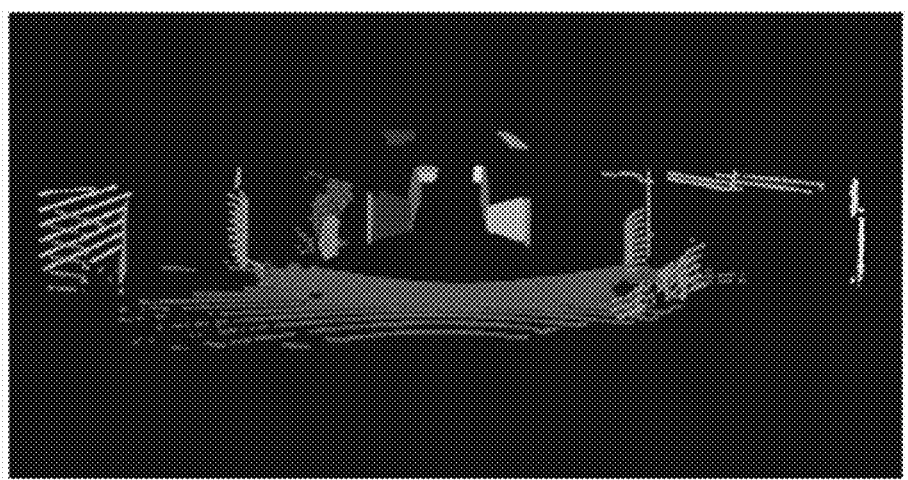

FIGS. 7A and 7B are views showing target planes extracted through the extrinsic calibration method according to the present disclosure. In FIGS. 7A and 7B, only parts, that is, target planes, recognized as a plane among point clouds illustrated in FIGS. 6A and 6B are expressed in specific colors.

Figure 8A:
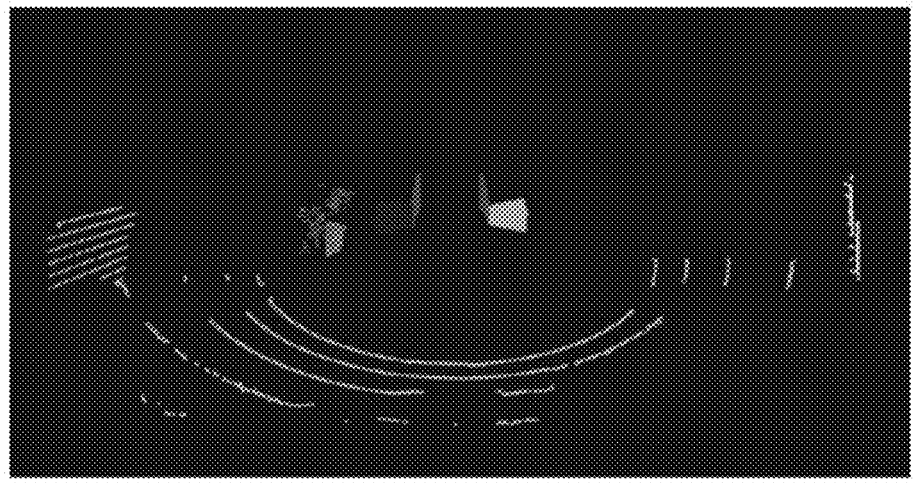
Figure 8B:
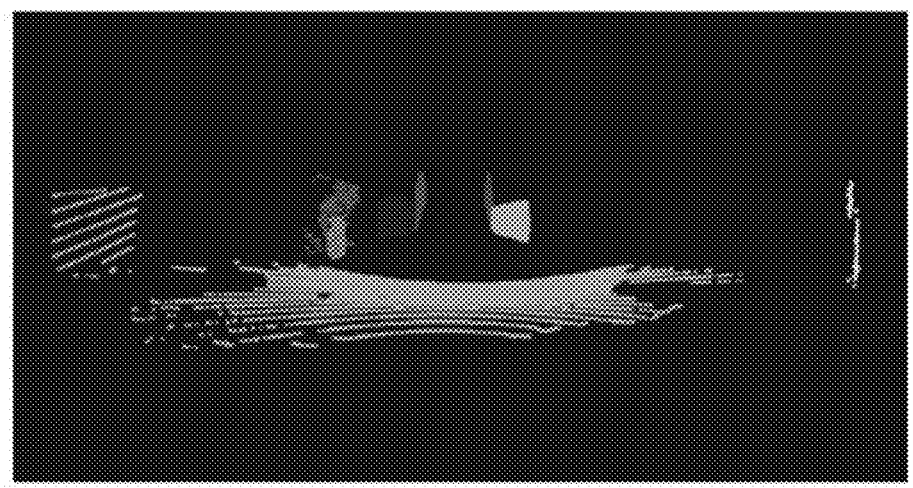

FIGS. 8A and 8B are diagrams showing a result of extracting a corresponding plane on the basis of a reference plane in the extrinsic calibration method according to the present disclosure. The reference plane and the corresponding plane are expressed in the same color. Here, it may be checked that the corresponding plane among the target planes does not exist as shown in FIG. 9A.

Figure 9A:
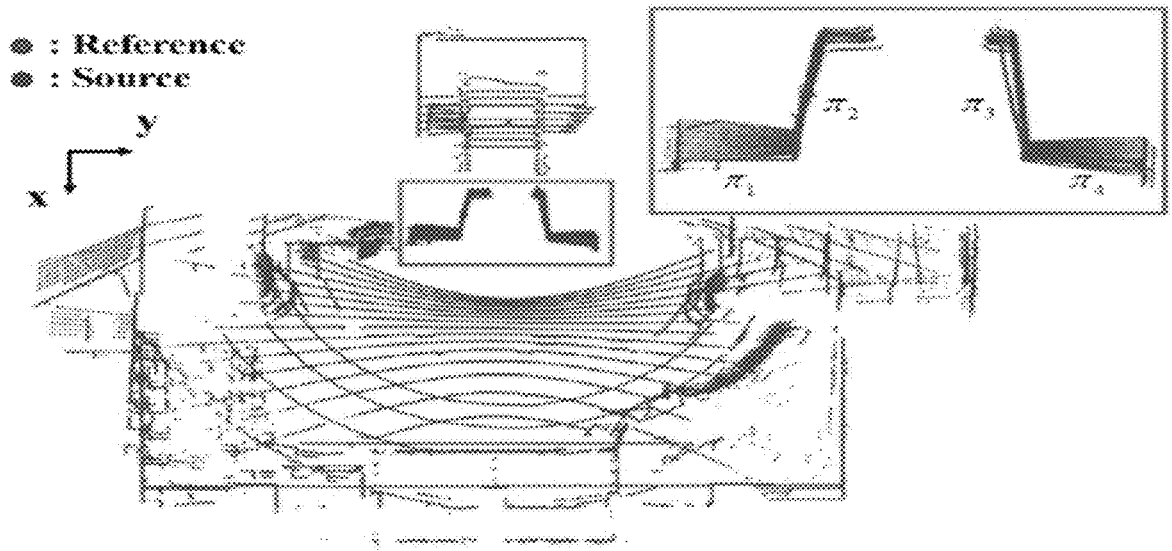
Figure 9B:
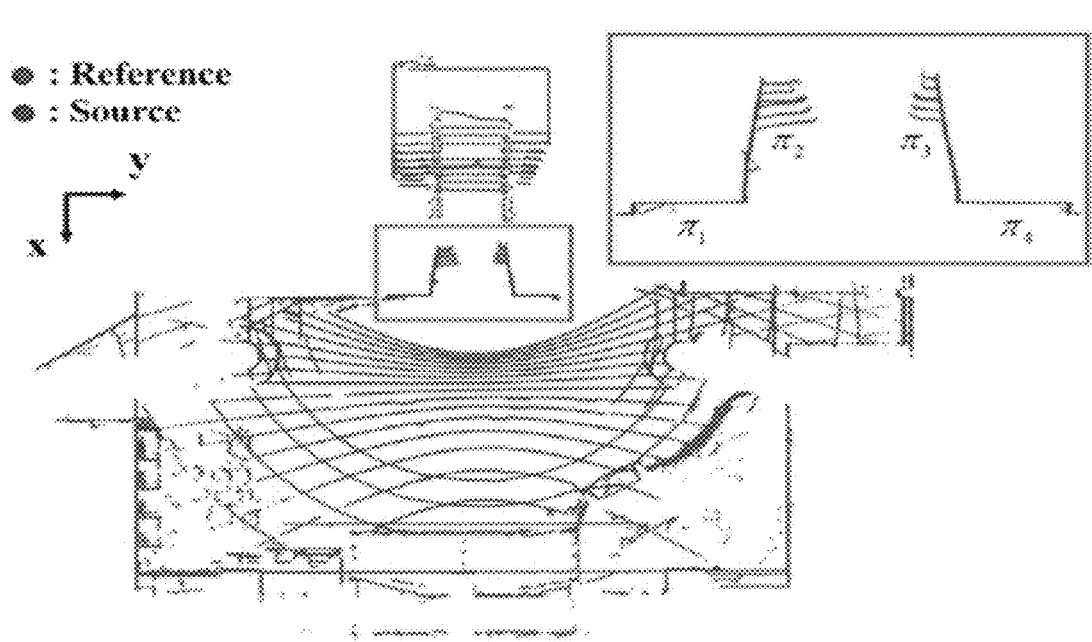
Figure 10A:
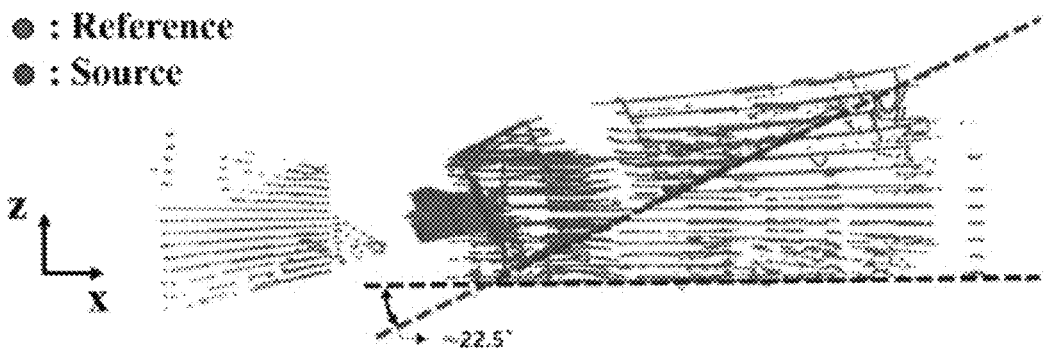
Figure 10B:
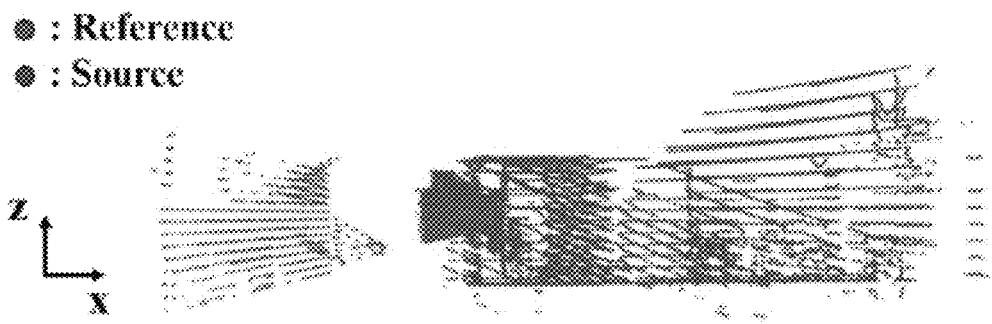

A result of correcting the point cloud of the calibration LiDAR sensor 120 by the extrinsic parameters finally calculated through the above process is as shown in FIGS. 9A, 9B, 10A, and 10B. FIGS. 9A and 9B are photographs of the front side, and FIGS. 10A and 10B are side views.

It may be seen that the point clouds of the two LiDAR sensors do not match each other before calibration from FIG. 9A and FIG. 10A and the matching is performed after calibration as shown in FIG. 9B and FIG. 10B.

Although the preferred embodiment of the present disclosure has been described above in detail, the scope of the present disclosure is not limited thereto, and various modifications and improvements of those skilled in the art using the basic concept of the present disclosure defined in the following claims also belong to the scope of the present disclosure.

What is claimed is:

1. An extrinsic calibration method of multiple 3D LiDAR sensors for an autonomous navigation system having a processor, the method comprising:
    collecting, by the processor, point clouds by each of the multiple 3D LiDAR sensors;
    extracting, by the processor, a plurality of target planes corresponding to a plane from the point clouds of each of the 3D LiDAR sensors;
    by using the target plane of any one of the multiple 3D LiDAR sensors as a reference plane, detecting, by the processor, a corresponding plane from the target planes of each of the remaining of the 3D LiDAR sensors on the basis of a similarity with the reference plane;
    calculating, by the processor, initial extrinsic parameters for matching between the reference plane and the corresponding plane on the basis of plane parameters of the reference plane and the corresponding plane corresponding to each other;
    calculating, by the processor, final extrinsic parameters that minimize variance of measurement points for the reference plane and the corresponding plane corresponding to each other, on the basis of the initial extrinsic parameters; and
    correcting the point clouds of the multiple 3D LiDAR sensors based on the final extrinsic parameters,
    wherein the extracting of the plurality of target planes comprises:
        extracting candidate planes corresponding to a plane from the point clouds for each of the 3D LiDAR sensors through a plane extraction algorithm previously registered; and
        extracting, as the target plane, a candidate plane that satisfies a predetermined plane condition from among the candidate planes, and,
    wherein the plane condition is expressed as a following equation:

$$P_\lambda = (\lambda_2 - \lambda_3)/\lambda_1 \geq P_{\lambda,thr}$$

$$\lambda_3 \leq \lambda_{thr}$$

$$n \geq n_{thr}$$

(where, $P_\lambda$ is a planarity of the candidate plane, $P_{\lambda,thr}$ is a predetermined reference planarity, $\lambda_{3is}$ variance in a normal direction of the candidate plane, $\lambda_{thr}$ is a predetermined reference variance, n is a number of point clouds constituting the candidate plane, and $n_{thr}$ is a predetermined reference number and $\lambda_1$ and $\lambda_2$ are variance in two axes which are vertical relative to the normal direction of the candidate plane, respectively).

2. The method of claim 1, wherein the plane extraction algorithm includes any one of a region growing segmentation technique based on smoothness constraint and a maximum likelihood estimator sample consensus (MLESAC) technique.

3. The method of claim 1, wherein in the detecting of the corresponding plane, the similarity is calculated using the plane parameters, and
    wherein the plane parameters include a normal vector, a distance from an origin, and a mass center.

4. The method of claim 3, wherein the detecting of the corresponding plane comprises:
    calculating, as similarity indexes, an angle between two planes, a distance between the two planes, and a mass center distance between the two planes, using the normal vector, the distance to the origin, and the mass center;
    calculating a sum of weights of the similarity indexes as a matching error of the two planes; and
    detecting a target plane having the smallest matching error with respect to the reference plane, as the corresponding plane of the reference plane, for each of the remaining 3D LiDAR sensors.

5. The method of claim 4, wherein the similarity indexes are calculated by a following equation:

$$\epsilon_{ang}(n_i^R, n_j^S) = \cos^{-1}\left(\frac{n_i^R \cdot n_j^S}{\|n_i^R\|\|n_j^S\|}\right)$$

-continued $$\epsilon_{euc}(d_i^R, d_j^S) = \|d_i^R - d_j^S\|$$

$$\epsilon_{cen}(\bar{p}_i^R, \bar{p}_j^S) = \|\bar{p}_i^R - \bar{p}_j^S\|$$

(where, $\epsilon_{ang}$ is the angle between the two planes, $\epsilon_{euc}$ is the distance between the two planes, $\epsilon_{cen}$ is the mass center distance between the two planes, n is the normal vector, $n_i^R$ is a normal vector of $i^{th}$ plane among the reference planes, $n_j^S$ is a normal vector of $j^{th}$ plane among the target planes, d is the distance from the origin, and $\bar{p}$ is the mass center, $\bar{p}_i^R$ is mass center of $i^{th}$ plane among the reference planes, and $\bar{p}_j^S$ is mass center of $j^{th}$ plane among the target planes), wherein the matching error is calculated by a following equation:

$$E(\pi_i^R, \pi_j^S) = w_1 \epsilon_{ang} + w_2 \epsilon_{euc} + w_3 \epsilon_{cen}$$

(where, $\pi^R$ is the reference plane, $\pi^S$ is the target plane of the remaining 3D LiDAR sensor, and w is the weight of each of the predetermined similarity indexes).

6. The method of claim 5, wherein the initial extrinsic parameters include an initial rotation transformation matrix and an initial translation vector, wherein the initial rotation transformation matrix is calculated by a following equation:

$$\tilde{R}_S^R = V \begin{pmatrix} 1 & 0 & 0 \\ 0 & 1 & 0 \\ 0 & 0 & \det(VU^T) \end{pmatrix} U^T$$

(where, $\tilde{R}_S^R$ is the initial rotation transformation matrix, cross covariance matrix of the normal vectors of the reference plane and the corresponding plane is $H = [n_1^S, \ldots, n_M^S][n_1^R, \ldots, n_M^R]^T$, singular value decomposition of the cross covariance matrix is $USV^T$, M is a number of the reference plane and corresponding plane pairs, H is the normal vector of the plane, a superscript R denotes the reference plane, and a superscript S denotes the corresponding plane, wherein the initial translation vector is calculated by a following equation:

$$\tilde{t}_S^R = (A^T A)^{-1} A \cdot b$$

$$A = \begin{bmatrix} (n_1^R)^T \\ \vdots \\ (n_M^R)^T \end{bmatrix}$$

$$b = \begin{bmatrix} -(n_1^R)^T R_S^R \bar{p}_1 - d_1^R \\ \vdots \\ -(n_M^R)^T R_S^R \bar{p}_M - d_M^R \end{bmatrix}$$

(where, $\tilde{t}_S^R$ is the initial translation vector, $\bar{p}$ is the mass center of a plane, and d is the distance from the origin in a plane).

7. The method of claim 6, wherein the calculating of the initial parameter is repeatedly performed until the matching error satisfies a predetermined convergence condition, so that the initial extrinsic parameters are finally calculated.

8. The method of claim 6, wherein the calculating of the final parameters is performed in such a manner as to minimize a cost function as following:

$$(\hat{R}_S^R, \hat{t}_S^R) = \underset{R_S^R, t_S^R}{\operatorname{argmin}} \sum_{i=1}^{M} \omega_i \sum_{j=1}^{N_i} E_{i,j}(\Theta)$$

$$E_{i,j}(\Theta) = \|n_i^R \cdot (R_S^R p_j^S + t_S^R) + d_i^R\|^2$$

(where, $\Theta$ is a set of extrinsic parameters, M is a number of the corresponding planes, $N_i$ is a number of measurement points in the i-th corresponding plane, $\omega_i$ is a weight of the i-th corresponding plane, $\omega_i^S = 1/(\sigma_i^S)^2$, and $\sigma_i^S$ is variance in a normal direction of the i-th corresponding plane), wherein the cost function is applied to a Levenberg-Marquardt technique, and the initial extrinsic parameters are applied as an initial value of the Levenberg-Marquardt technique.

* * * * *